Patented Oct. 13, 1942

2,298,375

UNITED STATES PATENT OFFICE 2,298,375

MANUFACTURE OF NITRO COMPOUNDS

Rudolph Leonard Hasche, Kingsport, Tenn., assignor to Eastman Kodak Company, Rochester, N. Y., a corporation of New Jersey No Drawing. Application June 23, 1939, Serial No. 280,799

10 Claims. (Cl. 260—644)

This invention relates to the manufacture of nitro compounds containing an unsaturated linkage and in particular to the manufacture of nitro compounds such as nitro ethylene, nitro styrene and the like.

Certain nitro olefines have been described in Berichte. However, prior art methods suggested for the manufacture of such compounds involve the use of rather expensive chemicals or otherwise possess disadvantages. Consequently, such compounds have not been extensively produced or employed on a large industrial scale.

I have found that the aforementioned nitro compounds containing an unsaturated linkage may be readily prepared by a few steps from commercially obtainable chemicals.

This invention has for one object to provide a novel and improved method for the manufacture of various nitro compounds containing an unsaturated linkage. A further object is the production of an unsaturated nitro compound by a one-stage process involving the union of formaldehyde with a nitro hydrocarbon or derivatives with a simultaneous splitting off of water. Still another object is to provide a novel method of manufacturing aliphatic and aromatic nitro compounds. Still another object is to provide a method of reacting nitro hydrocarbons or derivatives thereof with formaldehyde. Still another object is to provide a method for reacting formaldehyde with aliphatic nitro hydrocarbons or nitro paraffins in which one of the hydrogens has been substituted by an aromatic nucleus. A still further object is to provide catalysts and a catalytic process for carrying out the aforementioned process steps. Still another and more specific object is to provide a method particularly adapted to the reaction of nitro paraffins such as nitro methane with formaldehyde. Another object is to provide a process for preparing nitro compounds containing an unsaturated linkage, which process may be conducted entirely or to a large extent in the vapor phase and in a substantially continuous manner. A still further object is to produce nitro compounds containing an unsaturated linkage, which compounds are suitable for use in the production of polymers and other such purposes.

I have found that an aldehyde such as formaldehyde will, under the conditions of my reaction, add to the alpha carbon atom of a compound such as nitro hydrocarbon. Apparently the ability of the aldehyde to so add to the alpha carbon atom is by virtue of the activated hydrogen of the alpha carbon atom. It also appears that the activated hydrogen atom may migrate to the aldehyde molecule and result in a rearrangement giving a $CH_2OH$ group. If there is a second hydrogen on the alpha carbon atom to unite with the OH of the new group which has been added, water can be split out, yielding the unsaturated linkage obtained. By my process the addition of the aldehyde and the splitting out of water may be caused to take place apparently simultaneously, and in a relatively simple manner.

For instance, when nitro methane is caused to react with formaldehyde in accordance with my process, nitro ethylene results. Substituted nitro hydrocarbons, namely derivatives of nitro hydrocarbons, as for example, halogen substitution products may be employed in a similar manner, along or in admixture with other nitro hydrocarbons and formaldehyde.

The reactions in accordance with my invention would preferably be carried out in the presence of a catalyst and under conditions at least part of the time and preferably during the entire reaction period so that the reactants would be in the vapor phase when in contact with the catalyst.

The reaction may be carried out in any suitable apparatus. For example, the apparatus might comprise one vaporizer for the nitro hydrocarbon and another vaporizer for the formaldehyde. The conduits leading from the separate vaporizers would connect them to a catalyst chamber containing catalyst of the character described in detail hereinafter. Or, a single vaporizer for vaporizing previously mixed nitro hydrocarbon and formaldehyde could be provided, this vaporizer in turn being connected to the catalyst chamber. If desired, the vaporized constituents may be preheated, as for example, passing the incoming materials in heat exchange with the out-going reaction products. The catalyst chamber would then be connected to condensers, polymerization equipment or other units, depending upon the subsequent treatment which it is desired to apply to the nitro compound obtained.

The catalyst chamber may be filled with one or more of the following catalyst materials:

As already indicated, a number of catalysts have been found to be satisfactory in my process. Silica or alumina gel or comparable materials such as activated alumina are satisfactory. However, it is preferred to employ a composite catalyst comprising a material such as a gel, together with one or more metal salts or oxides. Another active form of catalyst is a natural or synthetic alumina impregnated with phosphoric or sulfuric acid.

In more detail, examples of preparing satisfactory catalysts are as follows:

To 140 cc. water was added 60 cc. glacial acetic acid. This solution was heated to about 50–60° C. and 60 g. of lead monoxide (PbO) was dissolved herein by adding the lead oxide in small portions. To this lead acetate solution was added 500 g. silica gel. Any excess liquid was removed by heating the silica gel either under a partial vacuum or in a slow stream of air.

This dried catalyst was then divided into three equal parts of about 225 g. each. Sample No. 1 was used as prepared and designated a lead acetate catalyst.

To sample No. 2 was added 50 cc. of an aqueous solution containing about 10 g. chromium trioxide. This converted the lead acetate to lead chromate. The excess liquid was again removed by heating. This catalyst was designated a lead chromate catalyst.

The third portion was treated with an aqueous sulfuric acid solution containing sulfuric acid somewhat in excess of the amount required to convert the lead acetate to lead sulfate.

It is to be understood that the preceding has been set forth merely for the purposes of illustration and not for limiting my invention. Other metal acetates, as for example sodium magnesium and cadmium acetate could be employed or other oxides as tungsten or molybdenum oxides. Also as indicated, phosphoric or sulfuric acid may be employed as impregnating mediums.

In general, my catalyst may comprise dehydration materials either simple or composite, as for example silica gel, impregnated with metal oxide or metal salt. By the term "gel" I refer to a variety of materials. The so-called commercial silica gel is made by a process wherein a mass that sets into a jelly-like material is obtained. This jelly-like material is washed and dried in a manner that it shrinks to about one-tenth its former volume and is a very hard dry solid. This product is composed of supermicroscopic pores or capillaries. These capillaries are very absorptive and will take up vapors as much as 50% or more of its weight. This is due to the fact that any liquid in extremely fine capillary suffers a decrease in vapor pressure. The pores of the gel may be of the order of five millionths of a millimeter which is only a few molecular diameters.

While it is relatively clear that my catalysts embrace such materials as silica gel or alumina gel, since they actually go through a gel stage in the preparation, my catalysts also embrace other materials having the same physical properties. For example, activated alumina is sometimes referred to as a gel and has comparable physical properties to silica gel respecting absorptive characteristics and the like. However, activated alumina does not pass through the gel stage during its method of preparation. Likewise, materials comprising hydrated sodium, aluminum, silicates, are satisfactory catalysts in my process.

In other words, my catalysts may embrace a variety of very high absorptive materials which materials may contain oxides and salts of metals such as sodium, calcium, lead, zinc, chromium and manganese. Since one distinctive property of the so-called activated or absorptive catalyst is that they are dehydration catalysts, for convenience herein I may designate my catalysts as dehydration catalysts. In other instances, I may define my catalysts as impregnated catalysts or gel catalysts.

As indicated above, one reaction which may be carried out in accordance with my invention is the reaction of nitro methane and formaldehyde. The nitro methane employed in the process may be obtained from any of the known methods comprising nitrating aliphatic hydrocarbons. A solution of formaldehyde may be the commercial quantity "Formalin" or, if desired, solid paraformaldehyde may be utilized. These constituents either previously mixed and vaporized or separately vaporized and mixed are passed in the vapor phase usually at temperatures substantially in excess of 200° C. and under normal atmospheric conditions in contact with a catalyst such as has been described in detail. The catalyst chamber was maintained at a temperature about 50°–100° higher than the temperature of the vaporized products fed thereto.

The reaction mixture issuing from the catalyst chamber in this instance contained a substantial amount of nitro ethylene which was condensed and isolated. It is pointed out in this connection that the nitro ethylene should not be directly contacted with water for condensation unless it is desired to cause the polymerization thereof.

However, as indicated above, if desired, polymerization treatment or other steps may be immediately applied to the nitro olefines issuing from the catalyst chamber.

While the reaction between formaldehyde and nitro methane has been given as an example, it is to be understood that my invention while particularly useful for this reaction, is not limited thereto. I have found that formaldehyde may be reacted with various other nitro paraffins as for example nitro ethane, nitro propane, nitro butane and higher derivatives.

I have also found that formaldehyde may be reacted with the nitro hydrocarbons in which at least one hydrogen is substituted by an aromatic nucleus such as benzene.

The following example showing the reaction of formaldehyde with phenol nitro-methane to produce alpha nitro styrene is in accordance with this latter type of reaction for producing aromatic nitro compounds:

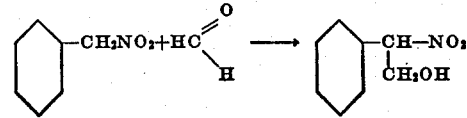

Phenyl nitro methane

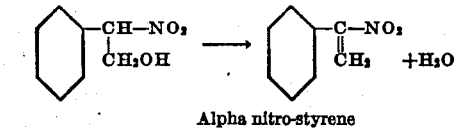

Alpha nitro-styrene

This reaction for producing an aromatic compounds was as the aforementioned reactions carried out in the presence of one of the catalysts described and under vapor phase conditions. When treating such compounds, temperatures 250°–350° C. or higher are preferably employed so that all of the constituents are in the vapor phase during the entire or at least for the greater part of the reaction.

Other combinations of reactants which may be treated in my process are as follows: naphthyl nitro methane and formaldehyde, furfuryl nitro methane, pyridyl nitro methane and formaldehyde.

As indicated above my reaction may be applied not only to simple nitro hydrocarbons but to derivatives thereof as well. For example my reaction may be considered as involving the compounds

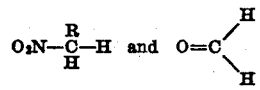

wherein R may represent hydrogen, an alkyl or substituted alkyl groups, an aromatic compound as a phenyl group, or halogens and the like. Examples of the latter would be chloronitromethane, chloronitroethane etc.

The temperature employed may be within the range of, for example 200° C. to 500° C. Space velocities above 600 may be employed. The reaction is readily susceptible to continuous operation as is apparent. While I may conduct the reaction under higher pressures or under reduced pressures, such conditions are not essential for the operation of the process.

My novel reaction furnishes a new and improved method for producing unsaturated nitro compounds which method is more economical than methods heretofore produced. The nitro compounds obtained in my process are useful in the production of polymers, as the starting material for various new products and for a number of other purposes. For example, nitro ethylene produced in accordance with my invention may be polymerized substantially instantly into colorless flakes to give a high polymer when the unsaturated nitro compound is poured into water. The higher molecular weight nitro compounds form similar polymers, for instance with nitro ethane and formaldehyde the product is nitro propylene which in some respects may be considered similar in structure to methacrylates.

It is apparent from the foregoing that my invention is susceptible of some modification; hence, I do not wish to be restricted, excepting insofar as is necessitated by the prior art and the spirit of the appended claims.

What I claim and desire to be secured by Letters Patent of the United States is:

1. The single-step direct process for the manufacture of nitro olefines which comprises preparing a vaporous mixture of a lower aliphatic nitro hydrocarbon and formaldehyde, reacting the mixture in the presence of a solid dehydration catalyst at a temperature between 200° C. and 500° C. so that reaction between the nitro hydrocarbon and formaldehyde takes place in the vapor phase.

2. The single-step direct process for the manufacture of nitro olefines which comprises contacting a lower aliphatic nitro hydrocarbon and formaldehyde with a solid dehydration catalyst having in its composition a content of a compound from the group consisting of lead oxide, lead acetate, and lead chromate, reacting the nitro hydrocarbon and formaldehyde at a temperature between 200° C. and 500° C. so that the reaction takes place in the vapor phase.

3. The single-step direct process for the manufacture of chlorine substituted nitro olefines which comprises contacting a vaporous mixture of a chloro lower alkyl nitro hydrocarbon and formaldehyde with a solid dehydration catalyst, reacting said nitro hydrocarbon and formaldehyde at a temperature between 200° C. and 500° C. so that the reaction takes place in the vapor phase.

4. A process which comprises reacting formaldehyde with a nitro compound having the formula:

RCH$_2$NO$_2$ wherein R represents a member from the group consisting of hydrogen, halogen, and alkyl, to simultaneous condensation and dehydration, and conducting the reaction in the presence of a solid non-caustic dehydration catalyst and at a temperature above 200° C. so that the condensation and dehydration take place substantially entirely in the vapor phase.

5. A process which comprises reacting formaldehyde with a nitro compound having the formula:

RCH$_2$NO$_2$ wherein R represents a member from the group consisting of hydrogen, halogen, and alkyl, to obtain simultaneous condensation and dehydration, and conducting the reaction in the presence of a gel as a catalyst and at a temperature so that the condensation and dehydration take place substantially entirely in the vapor phase.

6. A process which comprises reacting formaldehyde with a nitro compound having the formula:

RCH$_2$NO$_2$ wherein R represents a member from the group consisting of hydrogen, halogen, and alkyl, to obtain simultaneous condensation and dehydration, and conducting the reaction in the presence of silica gel as a catalyst and at a temperature so that the condensation and dehydration take place substantially entirely in the vapor phase.

7. A process which comprises reacting formaldehyde with a nitro compound having the formula:

RCH$_2$NO$_2$ wherein R represents a member from the group consisting of hydrogen, halogen, and alkyl, to obtain condensation and dehydration, and conducting the reaction in the presence of an impregnated gel as a catalyst and at a temperature so that the condensation and dehydration take place substantially entirely in the vapor phase.

8. The substantially continuous single-step chemical process for the production of unsaturated nitro compounds which comprises contacting formaldehyde and a nitro compound having the formula:

RCH$_2$NO$_2$ wherein R represents a member from the group consisting of hydrogen, halogen, and alkyl, with a solid non-caustic catalyst, the process being carried out at a temperature above 250° C. at least part of the time whereby the reaction will take place under vapor phase conditions.

9. A process which comprises reacting formaldehyde with a nitro compound having the formula:

RCH$_2$NO$_2$ wherein R represents a member from the group consisting of hydrogen, halogen, and alkyl, to obtain condensation and dehydration, and conducting the reaction in the presence of a solid dehydration catalyst at a temperature greater than 200° C., whereby the reaction of the formaldehyde with the nitro compound will take place under vapor phase conditions, and cooling the resultant reaction products containing an unsaturated nitro compound.

10. A process which comprises reacting formaldehyde with a nitro compound having the formula:

RCH$_2$NO$_2$ wherein R represents a member from the group consisting of hydrogen, halogen, and alkyl, to obtain condensation and dehydration, and conducting the reaction in the presence of a solid dehydration catalyst at a temperature between 200° C. and 500° C. and at a space velocity greater than 600.

RUDOLPH LEONARD HASCHE.